United States Patent
Gunda et al.

(10) Patent No.: US 11,435,994 B1
(45) Date of Patent: Sep. 6, 2022

(54) MULTI-PLATFORM APPLICATION INTEGRATION AND DATA SYNCHRONIZATION

(71) Applicant: People Center, Inc., San Francisco, CA (US)

(72) Inventors: Siddhartha Gunda, Milpitas, CA (US); Kyle Michael Boston, San Carlos, CA (US); Daniel Robert Buscaglia, San Francisco, CA (US); Dilanka Theshan Dharmasena, Silver Spring, MD (US); Ruhitaj Reddypalli, Tirupati—Andhra Pradesh (IN); Nilay Pochhi, Maharashtra (IN)

(73) Assignee: PEOPLE CENTER, INC., San Francisco, CA (US)

( * ) Notice: Subject to any disclaimer, the term of this patent is extended or adjusted under 35 U.S.C. 154(b) by 0 days.

(21) Appl. No.: 17/365,666

(22) Filed: Jul. 1, 2021

(51) Int. Cl.
*G06F 9/44* (2018.01)
*G06F 9/445* (2018.01)
(Continued)

(52) U.S. Cl.
CPC .................................... *G06F 8/61* (2013.01)

(58) Field of Classification Search
CPC ......... G06F 8/61; G06F 16/2365; H04L 41/02
See application file for complete search history.

(56) References Cited

U.S. PATENT DOCUMENTS

| 10,606,576 B1 * | 3/2020 | Tung ....................... G06F 21/31 |
| 2010/0115612 A1 * | 5/2010 | O'Brien .................. G06F 21/41 |
| | | 726/22 |

(Continued)

FOREIGN PATENT DOCUMENTS

CN          110892375 A   *   3/2020   ............ G06F 11/368

OTHER PUBLICATIONS

Tehreem Naeem, Application Integration: Definition, Benefits, and Challenges, Jan. 2020, pp. 1-11. https://www.astera.com/type/blog/application-integration/ (Year: 2020).*

(Continued)

*Primary Examiner* — Mongbao Nguyen
(74) *Attorney, Agent, or Firm* — Dority & Manning, P.A.

(57) ABSTRACT

Systems, devices, computer-implemented methods, and tangible non-transitory computer readable media for providing multi-platform application integration and data synchronization with third-party applications. For example, a computer-implemented method performed by a computing device may include obtaining third-party application data associated with a third-party application that is separate from a computing system that comprises organizational data of an organization, analyzing the third-party application data based on one or more rules associated with the computing system and integration information for integrating the third-party application with the organizational data of the organization, processing the third-party application data based on the integration information associated with the third-party application, and performing one or more operations associated with the organizational data based on processing the third-party application data.

14 Claims, 7 Drawing Sheets

(51) Int. Cl.
*G06F 9/455* (2018.01)
*G06F 8/61* (2018.01)

(56) References Cited

U.S. PATENT DOCUMENTS

| | | | |
|---|---|---|---|
| 2016/0094584 A1* | 3/2016 | Mehta | G06F 21/604 726/4 |
| 2017/0118220 A1* | 4/2017 | Barbara | G06F 21/604 |
| 2018/0067734 A1* | 3/2018 | Prasad | G06F 11/3438 |
| 2018/0232402 A1* | 8/2018 | Bhatti | G06F 16/9024 |
| 2018/0232403 A1* | 8/2018 | Bhatti | G06F 16/9024 |
| 2020/0065152 A1* | 2/2020 | Parmar | G06F 16/288 |
| 2020/0142750 A1* | 5/2020 | Kaplan | H04L 67/06 |
| 2020/0241896 A1* | 7/2020 | Hulbert | G06F 8/30 |
| 2020/0244549 A1* | 7/2020 | Finch | H04L 41/22 |
| 2020/0250170 A1* | 8/2020 | Doehrn | G06F 16/2365 |
| 2021/0055928 A1* | 2/2021 | Chandrasekhar | G06F 11/3688 |
| 2021/0075793 A1* | 3/2021 | Dunjic | H04L 63/0838 |
| 2021/0133761 A1* | 5/2021 | Cartwright | G06F 9/546 |
| 2021/0185120 A1* | 6/2021 | Zana | H04L 67/20 |
| 2021/0383252 A1* | 12/2021 | Arnold | G06F 16/957 |

OTHER PUBLICATIONS

Sopheon, Integration to Third-Party Applications, 2019, pp. 1-10. https://www.sopheon.com/wp-content/uploads/Sopheon-Product-Brief-Accolade-Integration-3rd-Party-Applications.pdf (Year: 2019).*
IBM Cloud Education, Application Integration, 2020, pp. 1-8. https://www.ibm.com/cloud/learn/application-integration (Year: 2020).*
Thomas Hoeger, API-led connectivity vs. MDM: How to use them together, Jun. 2021, pp. 1-10. https://blogs.mulesoft.com/api-integration/patterns/api-led-connectivity-vs-mdm/ (Year: 2021).*

* cited by examiner

MULTI-PLATFORM APPLICATION INTEGRATION AND DATA SYNCHRONIZATION

FIELD

The present disclosure generally relates to computer systems. More particularly, the present disclosure relates to the integration and synchronization of distributed applications and computer systems via computer networks and internet services.

BACKGROUND

Organizations use different types of software applications and computing systems to manage processes and information across an enterprise. Generally, each different application and computing system provides specialized features, functionality, and operations directed toward a specific solution. However, different applications and systems usually operate in isolation without communicating with one another and maintain their own separate sets of organizational information. As a result, organizational information often remains siloed and becomes inconsistent and inaccurate when one or more changes are not reflected across different applications and systems. Further, endless manual updates and numerous, bespoke software integrations usually are required to maintain accuracy and consistency of organizational information and to support organizational processes across various applications and systems. Therefore, a need exists for improved integration and synchronization involving various third-party applications and systems.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for providing multi-platform application integration and data synchronization with third-party applications. For example, a computer-implemented method performed by one or more processors may include obtaining third-party application data associated with a third-party application that is separate from a computing system that comprises organizational data of an organization, analyzing the third-party application data based on one or more rules associated with the computing system and integration information for integrating the third-party application with the organizational data of the organization, processing the third-party application data based on the integration information associated with the third-party application, and performing one or more operations associated with the organizational data based on processing the third-party application data.

Another example aspect of the present disclosure is directed to one or more tangible non-transitory computer-readable media storing computer-readable instructions that, when executed by one or more processors, cause the one or more processors of a computing system to perform operations. For example, the operations may include obtaining third-party application data associated with a third-party application that is separate from a computing system that comprises organizational data of an organization, analyzing the third-party application data based on one or more rules associated with the computing system and integration information for integrating the third-party application with the organizational data of the organization, processing the third-party application data based on the integration information associated with the third-party application, and performing one or more operations associated with the organizational data based on processing the third-party application data.

Another example aspect of the present disclosure is directed to a computing system having one or more processors that are communicatively coupled to one or more non-transitory computer-readable media with instructions that, when executed by the one or more processors, cause the one or more processors to perform operations. For example, the operations may include obtaining third-party application data associated with a third-party application that is separate from a computing system that comprises organizational data of an organization, analyzing the third-party application data based on one or more rules associated with the computing system and integration information for integrating the third-party application with the organizational data of the organization, processing the third-party application data based on the integration information associated with the third-party application, and performing one or more operations associated with the organizational data based on processing the third-party application data.

Other aspects of the present disclosure are directed to various systems, apparatuses, non-transitory computer-readable media, user interfaces, and devices for the configuration and implementation of application policies. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
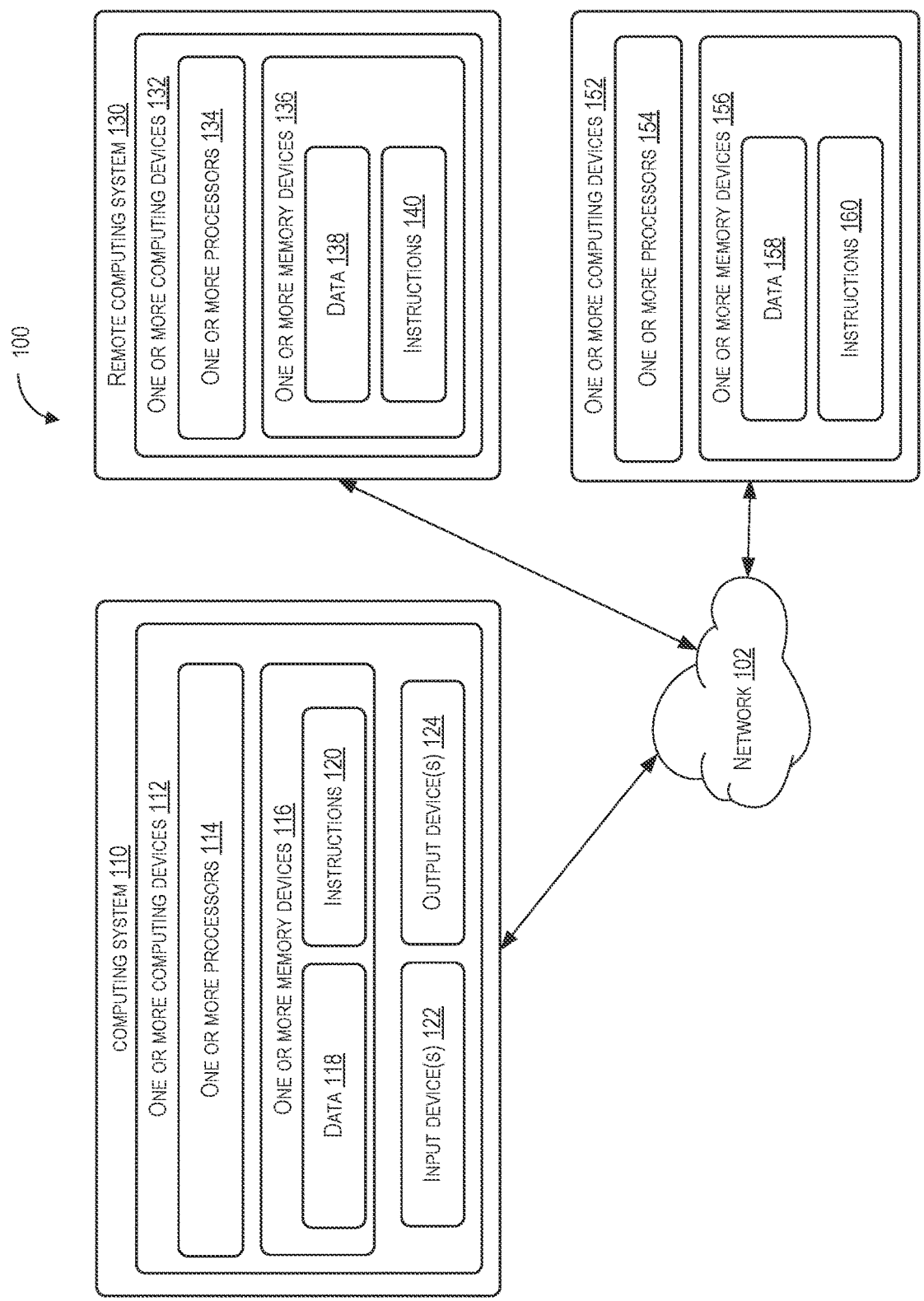
FIG. 1 depicts a block diagram of an example environment including a computing system that performs operations, according to example embodiments of the present disclosure.

Reference numerals that are repeated across plural figures are intended to identify the same features in various implementations.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to improving the integration and synchronization of organizational data and associated processing across different, distributed applications and systems provided by separate parties. In particular, examples described in the present disclosure enable automated integration and synchronization of organizational data and associated processing from a system of record, which provides consistency, accuracy, and availability of organizational data and associated processing across various disparate applications and systems of an organization.

Organizations generally use many applications and systems to sustain operations. For example, small organizations generally may use several, a dozen, or any number of applications and systems. Medium-sized organizations generally may use several dozen, a hundred, or any number of applications and systems. Large organizations generally may use hundreds, thousands, and/or any number of applications and systems. Many, most, and/or all of the applications and systems used by an organization rely on organizational data and processing tied to the organizational data.

However, very few applications and systems provided by one party (e.g., another organization, a vendor, a provider, a supplier, etc.) offer integration with applications and systems from other parties. As a result, organizations may build expensive, proprietary integration applications that require maintenance and usually break when one or more of the associated applications and/or systems is changed by the vendor (e.g., especially in scenarios where an organization defines and uses their own custom fields that rely on organizational data provided by a vendor application or system). Further, organizations that do not have the resources or expertise to build such proprietary integration applications rely on constant manual upkeep of organizational data across different applications and systems, which generally results in delays, inconsistencies, and errors. As such, organizations can benefit from improved application integration and synchronization of organizational data across different applications and systems.

The present disclosure provides examples of performing application integration and synchronization of data across distributed applications and systems. In examples of the present disclosure, a computer system may perform such integration and synchronization between applications and systems, for example, by obtaining application data associated with an application that is separate from a computing system that comprises organizational data of an organization, analyzing the application data based on one or more rules associated with the computing system and integration information for integrating the application with the organizational data of the organization, processing the application data based on the integration information associated with the third-party application, and performing one or more operations associated with the organizational data in the system based on processing the application data. The system also may generate and transmit information to one or more other applications integrated with the system based on performing the operations associated with the organizational data.

The systems, methods, and computer program products described herein provide a number of technical effects and benefits. As one example, the embodiments described in the present disclosure perform integration and synchronization of organizational data across a variety of applications and systems (e.g., 5, 10, 100, 1000, etc.) that utilize different underlying technologies and technical designs more efficiently and with fewer computing resources (e.g., less processing power, less memory usage, less power consumption, etc.), that would otherwise be wasted by maintaining custom, proprietary, and/or manual processes. In particular, examples of the present disclosure integrate organizational data and associated processing across different applications and systems using a rigorous computerized process that provides high-throughput, resilient, and rapid synchronization of organizational data across distributed applications and computing systems.

Some example aspects of the present disclosure can be implemented in or by an organizational management platform that controls and leverages organizational data to manage organizational applications such as payroll, operations, human resources (e.g., onboarding and offboarding), benefits, information technology and device management, third-party application integration and access, and many others.

The organizational management platform can hold, for each of one or more organizations, a centralized set of organizational data that acts as a single, centralized system of record for all organizational management processes for that organization. Each organization can include a number of users which are able to access and interact with the organizational management platform. Some users may have administrative permissions which define whether the user is able to access and/or modify certain types of organizational data for their organization.

The organizational data for each organization can include data directly entered into the organizational management platform and/or can include data retrieved, pulled, or otherwise obtained from one or more first party and/or third-party applications with which the organizational management platform may have varying levels of integration. This ingestion and storage of data from third-party applications is in contrast to systems which simply sit on top of third-party applications and apply rules at run time. In some implementations, the organizational management platform can provide a user with the ability (e.g., by configuring Simple Mail Transfer Protocol (SMTP) settings) to configure the cadence or periodicity at which the organizational management platform receives or ingests data (e.g., via .csv files) from third-party applications.

The organizational data can, in some implementations, be held as one or more object databases. For example, multiple object classes can be defined in the object databases. Example object classes include employees, devices, job candidates, benefits policies, documents, pay instances, timecards, and/or other objects. For each object, values can be provided and maintained for one or more attributes, such as location, role, salary, etc. Links can be made between different objects. For example, one or more device objects can be associated with employee objects.

The object database(s) can be represented as or can store data which can be represented as one or more graphs with nodes that correspond to objects and edges that correspond to links or logical associations between objects and/or object attribute(s). Graph(s) can be traversed to understand or leverage relationships among objects and their attribute(s). In one example, the organizational data can be synthesized into a single graph which includes multiple classes of objects and defines complex relationships among objects and their attribute(s). For example, all workflows, including payroll, IT, etc. can be run through one platform and graph. In some implementations, the employee objects can be referred to and/or treated as sentinel nodes.

In some implementations, the organizational data can include organizational structure data. For example, the organizational structure data can be encoded within links or edges defined between objects of the organizational data or can be stored as a separate data layer. For example, the organizational structure data can define organizational relationships between objects, including employee objects. As one example, the organizational structure data may indicate that a first employee object has the relationship of "manager" relative to a second employee object. The organizational relationships can be defined between specific objects and/or groups of objects. As another example, the organizational structure data may indicate that a first group of employees (e.g., the "IT Administrator" group of employees) has a certain set of permissions (e.g., device activation/deactivation) relative to a particular group of devices (e.g. the "work laptops" group of the devices).

Some example aspects of the present disclosure can leverage or be implemented using a domain-specific query language. For example, the domain-specific query language can be used to perform (e.g., in real time) queries against the organizational data. The domain-specific query language can be used to define functions or queries which return data that satisfies or responds to the functions or queries. In some implementations, the domain-specific query language is a declarative language. In some implementations, the domain-specific query language includes organization functions or operators which leverage organizational relationships within the organizational data. For example, the organization function ORG(employee,relationship) returns one or more other employees that have the specified relationship to the specified employee.

According to an aspect of the present disclosure, the organizational management platform can pull, retrieve, or otherwise receive data from one or more linked third-party applications. The organizational management platform can and then process or otherwise leverage this data in reports, policies, triggering, data management, and/or workflows using employee record data or other organizational data held by the core system of record.

As one example, an organizational management platform can receive application data from a third-party application of a plurality of third-party applications. The application data can be descriptive of an action performed in the third-party application. For example, the action can be a user-performed action performed by a user in the first third-party application or the action can be an application-performed action performed by the first third-party application. As one example, the action can describe an update to data stored in or otherwise associated with the first third-party application.

The organizational management platform can access one or more rules associated with an organization and integration information for integrating the third-party application with the organizational data of the organization. The access of the integration information can be performed periodically and/or in specific response to receipt of the data from the third-party application. The integration information associated with the third-party application can describe how changes to various forms of data (e.g., data contained in the platform's centralized database and/or data contained in the third-party application) should cause actions (e.g., data updates) to be performed in the third-party application and/or in the centralized database. One or more sets of integration information can be defined for each application. Integration information may be specific to each application and/or may be shared across multiple applications.

The organizational management platform can evaluate the integration information associated with the third-party application to determine one or more operations associated with implementing the integration information. The one or more operations associated with implementing the integration information can include causing an action to be performed in the third-party application and/or causing an action to be performed in the platform's centralized database. As one example, an action in the platform's centralized database can include an update to data stored in the database (e.g., an employee record stored in the database).

In some instances, the organizational management platform can communicate with the third-party application to cause the action to be performed in the third-party application by the third-party application. For example, the action in the third-party application can include updating of data held by the third-party application or other actions within the third-party application (e.g., triggering of intra-application communications, etc.).

In some implementations, the rules, integration information, and/or application policy associated with the third-party application can be a user-defined policy defined by an administrator of the organizational management platform. As one example, the user-defined application policy can be a user-defined query expressed in a domain-specific query language. In such instances, evaluating the policy can include executing the user-defined query relative to the set of organizational data. For example, the query may return a set of results (e.g., employee objects or other data objects) for which actions should be taken in the third-party application and/or within the centralized database.

With reference to the Figures, example embodiments of the present disclosure will be discussed in further detail.

FIG. 1 depicts a block diagram of an example environment 100 including a computing system 110 that performs operations according to example embodiments of the present disclosure. The environment 100 includes a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 can include a local area network (LAN), a wide area network (WAN), an intranet, an extranet, and/or the internet. Further, the network 102 can include any number of wired or wireless connections and/or links that can be used to communicate with one or more computing systems (e.g., the computing system 110 and/or the remote computing system 130) and/or one or more devices (e.g., the one or more computing devices 152). Communication over the network 102 can be performed via any type of wired and/or wireless connection and can use a wide variety of communication protocols (e.g., TCP/IP, HTTP, SMTP, FTP), encodings or formats (e.g., HTML, XML), and/or protection schemes (e.g., VPN, secure HTTP, SSL).

The computing system 110 can include any combination of systems and/or devices including one or more computing systems (not shown) and/or one or more computing devices 112. Further, the computing system 110 may be connected (e.g., networked) to one or more computing systems (e.g., remote computing system 130) and/or one or more computing devices (e.g., one or more computing devices 132, 152) via the network 102. The computing system 110 may operate in various different configurations including as a server or a client machine in a client-server network environment, or as a peer machine in a peer-to-peer (or distributed) network environment. Though the computing system 110 is depicted in FIG. 1 as a single device, the computing system 110 can include any collection or combination of devices that individually or in combination with other devices, execute a set of one or more instructions to perform any one or more of the operations discussed herein.

In this example, the computing system 110 includes the one or more computing devices 112. The one or more computing devices 112 can include any type of computing device. For example, the one or more computing devices 112 can include a personal computing device (e.g., a desktop computing device), a mobile computing device (e.g., a smartphone or tablet device), a wearable computing device (e.g., a smartwatch device), an embedded computing device, a web appliance, a server computing device, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can include any processing device (e.g., a processor core, a microprocessor, an ASIC, a FPGA, a controller, or a microcontroller) and can include one processor or multiple processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random-access memory (RAM), read-only memory (ROM), EEPROM, EPROM, one or more flash memory devices, and/or one or more magnetic storage devices (e.g., one or more hard disk drives).

The one or more processors 114 can be configured to execute one or more instructions to perform the operations described herein including, for example, one or more operations associated with providing multi-platform application integration and data synchronization across one or more applications including, for example, third-party applications. Further, the one or more memory devices 116 can store the data 118 and/or the instructions 120, which can be executed by the one or more processors 114 to cause the one or more computing devices 112 to perform one or more operations. For example, the one or more operations performed by the one or more processors 114 can include obtaining third-party application data, analyzing third-party application data based on one or more rules and/or integration information associated with a related third-party application, processing the third-party application data based on the integration information and one or more organizational records, and performing one or more operations associated with the organizational data based on processing third-party application data, etc.

The data 118 can include organizational data (e.g., organizational data that can include one or more organizational records), one or more data structures defining, describing, and/or otherwise associated with the organizational data, rule data (e.g., rule data that includes one or more rules used to configure an application policy, one or more rules maintained by or otherwise associated with an organizational data management system, etc.), application data (e.g., application data associated with a plurality of applications including one or more third-party applications and/or one or more intra-organizational applications), third-party integration data (e.g., data providing configuration and/or other information for performing integration and synchronization with each of one or more different third-party systems and/or applications), organizational policy data (e.g., organizational policy data associated with one or more organizational policies), application policy data (e.g., policy data that includes one or policies associated with the organizational data, the rule data, the application data, one or more applications, one or more devices, etc.), and/or other types of data. Further, the instructions 120 can include one or more instructions to use data including the data 118 to perform any one or more of the various operations described herein. In some embodiments, the one or more memory devices 116 can be used to store one or more applications that can be operated by the one or more processors 114. The data 118, the instructions 120, and/or the one or more applications can be associated with an organization. Further, the computing system 110 may be associated with an organization and may be configured to manage the one or more applications. For example, the computing system 110 can perform one or more operations associated with authenticating one or more users that attempt to access the one or more applications which can include one or more third-party applications, which may be remote from the computing system 110.

Any of the one or more computing devices 112 can include one or more input devices 122 and/or one or more output devices 124. The one or more input devices 122 can be configured to receive input (e.g., user input) and can include one or more touch screens, one or more keyboards, one or more pointing devices, (e.g., mouse device), one or more buttons, one or more microphones, and/or one or more cameras. The one or more output devices 124 can include one or more display devices, one or more loudspeaker devices, one or more haptic output devices. By way of example, the one or more output devices 124 can be used to display a graphical user interface via a display device that can include a touch screen layer that is configured to detect one or more inputs (e.g., one or more user inputs). The one or more processors 114 may perform one or more operations (e.g., operations associated with providing application integration and synchronization) based at least in part on the one or more inputs.

The remote computing system 130 includes the one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110. Further, the remote computing system 130 can communicate with one or more devices and/or one or more systems via the network 102.

In some embodiments, the remote computing system 130 can include one or more applications (e.g., computer software applications) that can be stored and/or executed by the remote computing system 130. Further, the one or more applications can include one or more third-party applications that may be accessed from the computing system 110 and which are at least partly operated from the remote computing system 130. The one or more third-party applications generally may be associated with and provided by an organization that is different from the organization that is associated with the computing system 110. Further, the data 138 can include one or more portions of the organizational data (e.g., one or more organizational records), one or more data structures associated with the organizational data, rule data, organizational policy data, application policy data, third-party integration data, and/or other types of data.

One or more computing devices 152 (e.g., user devices or any other types of devices) can include one or more processors 154, one or more memory devices 156, the data 158, and/or the instructions 160. Such one or more computing devices 152 may include any of the attributes and/or capabilities of the one or more computing devices 112, 132. Further, such one or more computing devices 152 can communicate with one or more devices and/or one or more systems via the network 102.

In some embodiments, the one or more computing devices 152 can include one or more applications (e.g., computer software applications) that can be stored and/or executed by such one or more computing devices 152. Further, the one or more applications can include one or more third-party applications that may be accessed from the one or more computing devices 152 and which are at least partly operated from such one or more computing devices 152. Data 138 may include, for example, one or more portions of the organizational data (e.g., one or more organizational records), one or more data structures associated with the organizational data, rule data, organizational policy data, application policy data, third-party integration data (e.g., third-party application integration data), and/or other types of data.

Figure 2:
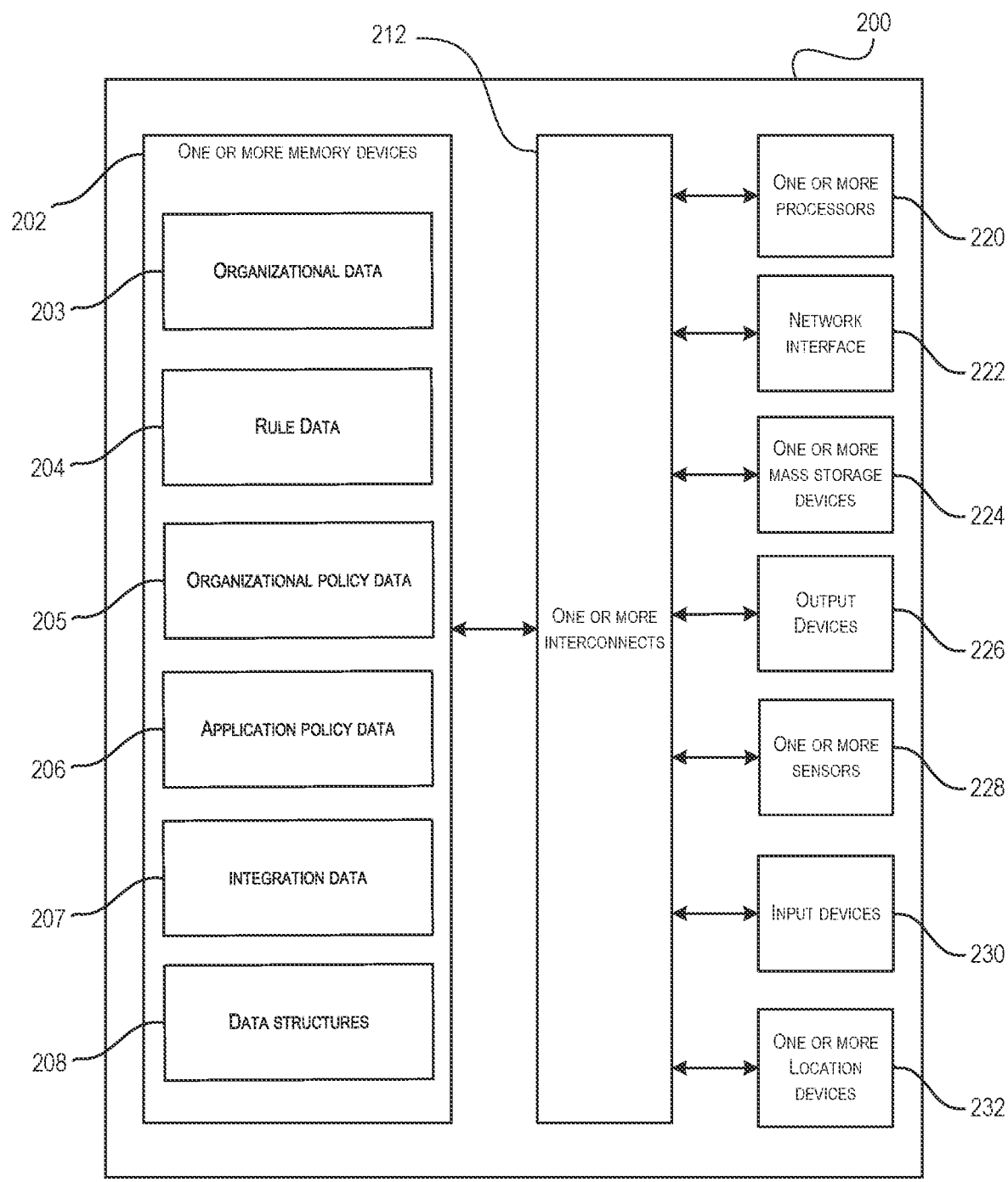
FIG. 2 depicts a block diagram of an example of a computing device, according to example embodiments of the present disclosure.

FIG. 2 depicts a block diagram of an example computing device 200 according to example embodiments of the present disclosure. The computing device 200 can include one or more attributes and/or capabilities of the computing system 110, the remote computing system 130, the one or more computing devices 152, and/or the computing device 200. Furthermore, the computing device 200 can be configured to perform one or more operations and/or one or more actions that can be performed by the computing system 110, the remote computing system 130, the one or more computing devices 152, and/or the computing device 200.

As shown in FIG. 2, the computing device 200 can include one or more memory devices 202, organizational data 203, rule data 204, organizational policy data 205, application policy data 206, integration data 207, data structures 208, one or more interconnects 212, one or more processors 220, a network interface 222, one or more mass storage devices 224, one or more output devices 226, one or more sensors 228, one or more input devices 230, and/or one or more location devices 232.

The one or more memory devices 202 can store information and/or data (e.g., organizational data 203, rule data 204, organizational policy data 205, application policy data 206, integration data 207, data structures 208, and/or any other data). Further, the one or more memory devices 202 can include one or more non-transitory computer-readable storage media, including RAM, ROM, EEPROM, EPROM, flash memory devices, magnetic disks, and any combination thereof. The information and/or data stored by the one or more memory devices 202 can be executed by the one or more processors 220 to cause the computing device 200 to perform one or more operations associated with providing application integration and data synchronization across one or more third-party applications, including, for example, obtaining third-party application data, analyzing third-party application data based on one or more rules and integration information associated with a related third-party application, processing the third-party application data based on the integration information and one or more organizational records, and performing one or more operations associated with the organizational data based on processing third-party application data.

The organizational data 203 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored respectively in any of the one or more memory devices 116, 136, 156. The organizational data 203 also can include information associated with one or more applications (e.g., one or more third-party applications), one or more organizational records and/or one or more organizational policies. In some embodiments, the organizational data 203 can be received from one or more computing systems (e.g., the remote computing system 130 depicted in FIG. 1) which can include one or more computing systems that are remote (e.g., in another room, building, part of town, city, or nation) from the computing device 200.

The rule data 204 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. The rule data 204 can include information associated with one or more rules that can be used to generate and/or implement an application policy. The rule data 204 also can include information associated with one or more rules of an organizational data management system (e.g., base or default rules provided or enforced by the system, one or more custom rules configured by an organization, etc.). In some embodiments, the rule data 204 can be received from one or more computing systems (e.g., the remote computing system 130 depicted in FIG. 1), which can include one or more computing systems that are remote from the computing device 200.

The organizational policy data 205 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the organizational policy data 205 can include information associated with one or more organizational policies that are used to regulate one or more applications (e.g., one or more third-party applications), one or more computing devices, and/or one or more records which can include one or more organizational records and/or one or more employee records. In some embodiments, the organizational policy data 205 can be received from one or more computing systems (e.g., the remote computing system 130 depicted in FIG. 1) which can include one or more computing systems that are remote from the computing device 200.

The application policy data 206 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the application policy data 206 can include information associated with one or more policies that are used to implement an application policy associated with one or more applications (e.g., one or more third-party applications), one or more computing devices, and/or one or more records which can include one or more organizational records and/or one or more employee records. In some embodiments, the application policy data 206 can be received from one or more computing systems (e.g., the remote computing system 130 depicted in FIG. 1) which can include one or more computing systems that are remote from the computing device 200.

The integration data 207 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. The integration data 207 can include configuration and/or operational information associated with integrating and synchronizing data among one or more applications. For example, the integration data 207 can include information that enables integration and synchronization between each of one or more applications (e.g., third-party applications or other applications). In an embodiment, the integration data 207 provides integration information that allows an organizational data management (e.g., a system of record for organizational data and organizational data processing), for example, to obtain information from one or more applications (e.g., third party and/or other applications), to perform operations involving organizational data in the organizational data management system, to synchronize organizational data across one or more applications, to perform one or more actions involving the applications based on organizational data in the organizational data management system, and/or to perform one or more other operations associated with managing organizational data as a system of record. In some embodiments, the integration data 207 can be received from one or more computing systems (e.g., the remote computing system 130 depicted in FIG. 1), which can include one or more computing systems that are remote from the computing device 200.

The data structures 208 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. The data structures 208 can include one or more logical and/or physical instances of information representing or describing one or more entities (e.g., objects, records, etc.), one or more relationships involving one or more of the entities, one or more data values associated with each of one or more of the entities and/or one or more of the relationships, one or more functions and/or operations that may be applied to each of one or more of the entities and/or one or more of the relationships, any other data or metadata describing or otherwise defining structure and/or rules associated with one or more of the entities and/or one or more of the relationships, etc.

The data structures 208 can be implemented and utilized with one or more types of computer software, computer hardware, or any combination thereof. In an embodiment, the data structures 208 are used to represent and perform processing associated with various types of organizational data. For example, the data structures 208 may include information about various types of information and entities associated with organizational data including, but not limited to, individuals (e.g., employees, vendors, independent contractors), departments, teams, groups, locations, offices, documents, tasks, reports, accounts, devices, applications, end-user applications, licenses, workflows, alerts, and/or any other types of entities representing or related to managing organizational data. The data structures 208 also can define various relationships among the various entities associated with organizational data. For example, the data structures 208 may define and be used to enforce relationships such as each employee must be assigned to a department, each employee can be included on one or more teams, each employee must be assigned to a primary location, each employee may be assigned to one or more secondary locations, employees may have one or more computing devices, each vendor must have a current audit, each independent contractor must be associated with a contract, and/or any other relationships provided by an organizational data management system or configured for an organization that utilizes an organizational data management system (e.g., a system for managing organizational data based on one or more organizational data management applications).

In some embodiments, the data structures 208 can include one or more object graphs providing information about entities, relationships, and/or any other aspects relating to the definition, structure, and rules associated with organizational data. The data structures 208 also can include any one or more other types of data structures (e.g., with or without the use of object graphs) that provide information about entities, relationships, and/or any other aspects of the definition, structure, and rules associated with organizational data. In some embodiments, the data structures 208 can be received from one or more computing systems (e.g., the remote computing system 130 depicted in FIG. 1), which can include one or more computing systems that are remote from the computing device 200.

The one or more interconnects 212 can include one or more interconnects or buses that can be used to send and/or receive one or more signals (e.g., electronic signals) and/or data (e.g., organizational data 203, rule data 204, organizational policy data 205, application policy data 206, integration data 207, data structures 208, and/or any other data) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the one or more location devices 232. The one or more interconnects 212 can be arranged or configured in different ways. For example, the one or more interconnects 212 can be configured as parallel or serial connections. Further the one or more interconnects 212 can include one or more internal buses that are used to connect the internal components of the computing device 200 and one or more external buses used to connect the internal components of the computing device 200 to one or more external devices. By way of example, the one or more interconnects 212 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the organizational data 203, the rule data 204, the organizational policy data 205, the application policy data 206, the integration data 207, the data structures 208, and/or any other data. The one or more processors 220 can include single or multiple core devices including a microprocessor, microcontroller, integrated circuit, and/or a logic device.

The network interface 222 can support network communications. The network interface 222 can support communication via networks including a local area network and/or a wide area network (e.g., the internet). For example, the network interface 222 can allow the computing device 200 to communicate with the computing system 110 via the network 102.

The one or more mass storage devices 224 (e.g., a hard disk drive and/or a solid-state drive) can be used to store data including the organizational data 203, the rule data 204, the organizational policy data 205, the application policy data 206, the integration data 207, the data structures 208, and/or any other data. The one or more output devices 226 can include one or more display devices (e.g., liquid crystal display (LCD), OLED display, mini-LED display, micro-LED display, plasma display, and/or cathode ray tube (CRT) display), one or more light sources (e.g., LEDs), one or more loudspeakers, and/or one or more haptic output devices (e.g., one or more devices that are configured to generate vibratory output).

The one or more sensors 228 can be configured to detect various states and can include one or more cameras, one or more light detection and ranging (LiDAR) devices, one or more sonar devices, and/or one or more radar devices. Further, the one or more sensors 228 can be used to provide input (e.g., an image of a user captured using the one or more cameras) that can be used as part of invoking or performing one or more operations. For example, the one or more sensors 228 can be used to authenticate the identity of a user and determine an authorization level based on an image of the user's face that is captured using the one or more sensors 228.

The one or more input devices 230 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 200).

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, and/or network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. For example, the one or more memory devices 202 can store sets of instructions for one or more applications (e.g., one or more organizational applications and/or one or more third-party applications) that are subject to one or more application policies or utilize third-party integration data that can be configured, generated, and/or implemented by the computing device 200 and/or one or more other computing devices or one or more computing systems. In some embodiments, the one or more memory devices 202 can be used to operate or execute a general-purpose operating system that operates on mobile computing devices and/or and stationary devices, including for example, smartphones, laptop computing devices, tablet computing devices, and/or desktop computers.

The software applications that can be operated or executed by the computing device 200 can include applications associated with the computing system 110, the remote computing system 130, and/or the one or more computing devices 152 that are depicted in FIG. 1. Further, the software applications that can be operated and/or executed by the computing device 200 can include native applications, web services, and/or web-based applications.

The one or more location devices 232 can include one or more devices or circuitry for determining the position of the computing device 200. For example, the one or more location devices 232 can determine an actual and/or relative position of the computing device 200 by using a satellite navigation positioning system (e.g. a GPS system, a Galileo positioning system, the GLObal Navigation satellite system (GLONASS), the BeiDou Satellite Navigation and Positioning system, an inertial navigation system, a dead reckoning system, based on IP address, by using triangulation and/or proximity to cellular towers or Wi-Fi hotspots, and/or beacons.

Figure 3:
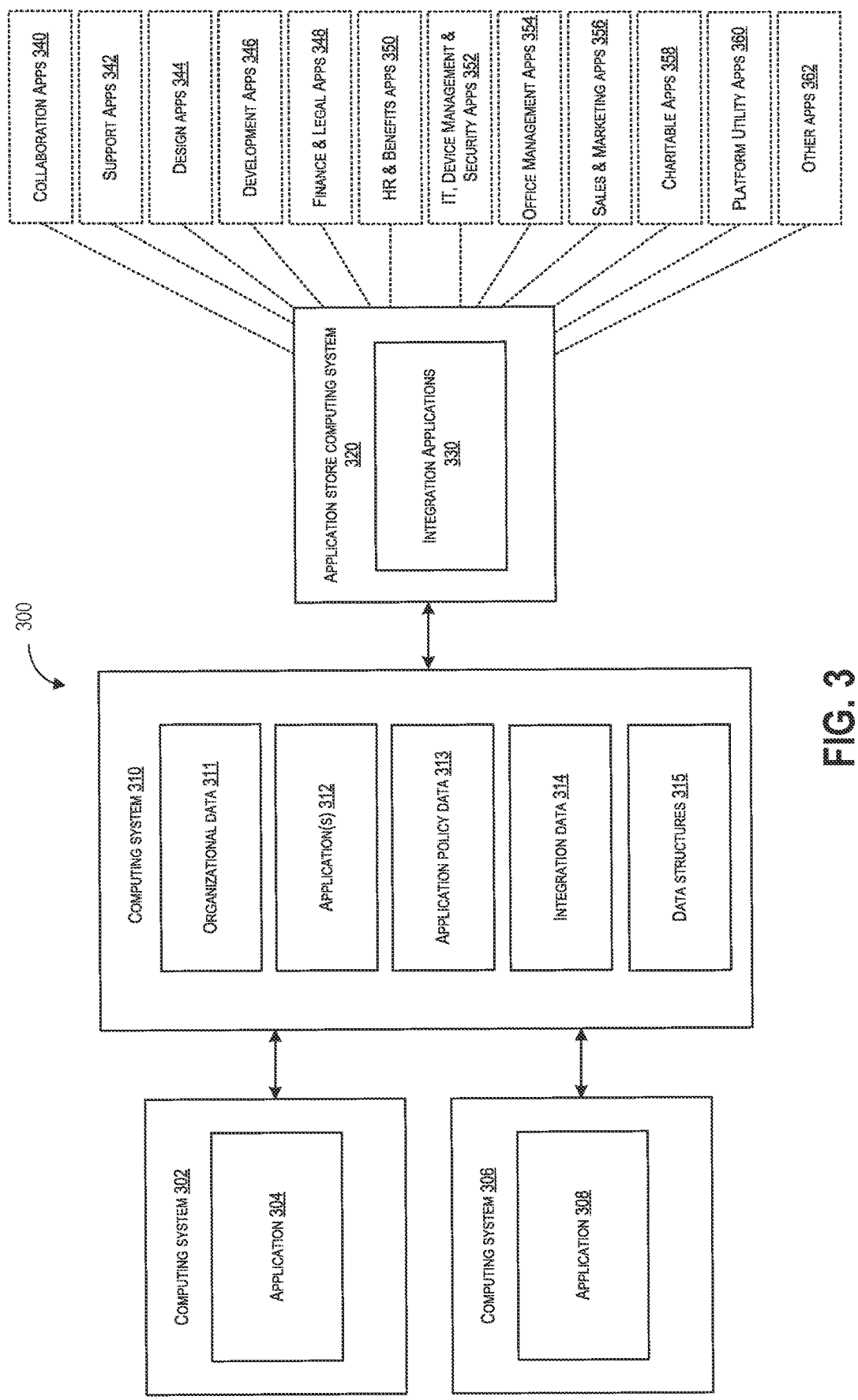
FIG. 3 depicts a block diagram of an example computing environment including multiple computing systems, according to example embodiments of the present disclosure.

FIG. 3 depicts a block diagram of an example computing environment 300 including multiple computing systems, according to example embodiments of the present disclosure. Any of computing system 302, computing system 306, or computing system 310 can include one or more attributes and/or capabilities of the computing system 110, the remote computing system 130, the one or more computing devices 152, and/or the computing device 200. Furthermore, any of the computing system 302, the computing system 306, or the computing system 310 can be configured to perform one or more operations and/or one or more actions that can be performed by the computing system 110, the remote computing system 130, the one or more computing devices 152, and/or the computing device 200.

As shown in FIG. 3, the environment 300 includes the computing system 302, an application 304, the computing system 306, an application 308, the computing system 310, organizational data 311, one or more application(s) 312, application policy data 313, integration data 314, data structures 315, application store computing system 320, integration applications 330, collaboration apps 340, support apps 342, design apps 344, development apps 346, finance and legal apps 348, human resources (HR) and benefits apps 350, information technology (IT), device management, and security apps 352, office management apps 354, sales and marketing apps 356, charitable apps 358, platform utility apps 360, and other apps 362.

In an embodiment, the computing system 302, the computing system 306, the computing system 310, and/or the application store computing system 320 can be configured to communicate directly and/or via a communication network (e.g., the network 102 depicted in FIG. 1). In one embodiment, the computing system 302 includes an application 304 that is stored and/or operates on the computing system 302 and can communicate (e.g., send and/or receive data and/or information) with one or more other computing systems including the computing system 306 and/or the computing system 310. The application 304 can, for example, include an email application that performs one or more operations on the computing system 302 and includes an email account associated with an organizational record (e.g., an employee record including the name of an employee, an email access identifier, and an email passcode) that is stored as part of the organizational data 311. In an example, a user associated with any computing system 302, 306, 310 can use a portion of the organizational data 311 associated with their employee record to access a corresponding account associated with one or more of application 304, application 308, and/or application(s) 312.

In an embodiment, the computing system 310 includes one or more application(s) 312 that can perform one or more operations on the computing system 310 and can communicate data and/or information with any one or more computing systems, including the computing system 302 and/or the computing system 306, or any one or more computing devices. The application(s) 312 can, for example, include an employee management application that operates on the computing system 310 and accesses the organizational data 311, which can include one or more organizational records associated with the names of organization employees and the respective employment statuses for each of the employees (e.g., an employee's position or role within the organization, an organizational department associated with the employee, etc.). A user (e.g., a privileged user, such as a manager or administrator with the authority to access and/or modify the organizational data 311) associated with the computing system 306 can, for example, access and/or modify the organizational data 311 to reflect when an employee receives a promotion or a raise, changes to a different department, is added to one or more new teams, etc.

The one or more application(s) 312 can perform one or more operations on the computing system 310 and can communicate data and/or information with one or more computing systems, including the computing system 302 and/or the computing system 306, or any one or more computing devices. The application(s) 312 can, for example, include an administrative or other type of system application to manage one or more aspects of the application(s) 312 including, but not limited to, installing, configuring, maintaining, updating, integrating, automating and/or performing one or more other operations associated with the application(s) 312 on the computing system 310 and that can manage one or more aspects of one or more other applications on different systems and devices, which may include the application 304 and/or the application 308.

In some embodiments, the application(s) 312 can include one or more third-party applications that are stored and/or perform operations on the computing system 310. Further, the application(s) 312 can retrieve data and/or information associated with and/or operate in cooperation with applications external to the computing system 310 (e.g., the computing system 302 and/or the computing system 306). The application(s) 312 can also use (e.g., access, modify, and/or control) the organizational data 311. For example, the application(s) 312 can use the organizational data 311 that is associated with the application 304 to perform one or more operations using the application 308 that is on the computing system 306.

The computing system 310 includes the application policy data 313 which can be implemented on the computing system 310 and can be used to perform one or more operations associated with implementing an application policy associated with the organizational data 311 and/or one or more applications including the application 304, the application 308, and/or application(s) 312. The application 304, the application 308, and/or application(s) 312 can include one or more third-party applications that are separate from, that are operated separate and apart from, and that are not affiliated with the organization that manages, owns, controls and/or maintains the organizational data 311 or an associated organizational data management application on the computing system 310, and/or that determines or implements an application policy associated with the application policy data 313. In one example, third-party applications can be differentiated from organizational applications that, for example, are inherent to, are a part of, or otherwise operate directly or as part of an organizational data management application, system, services, or platform.

The application policy data 313 can include one or more rules that determine how one or more applications including, for example, one or more third-party applications or organizational applications are accessed, modified, and/or controlled. For example, the application policy data 313 can use the organizational data 311 that is associated with the application(s) 304 to perform one or more operations on the application(s) 312 and/or the application 308. Also, the application policy data 313 can use the organizational data 311 that is associated with the application(s) 312 to perform one or more operations on the application 304 and/or the application 308. By way of further example, the application policy data 313 can use the organizational data 311 that is associated with the application 308 to perform one or more operations on the application 304 and/or the application(s) 312. In some embodiments, the application policy data 313 can determine how a combination of one or more organizational applications (e.g., applications owned and controlled by an organization that owns and controls the organizational data 311 and/or applications provided with or as part of an organizational data management system used by the organization as the system of record for maintaining the organizational data 311, etc.) and/or one or more third-party applications are accessed, modified, configured, and/or controlled.

The computing system 310 includes the integration data 314, which can reside on the computing system 310 and can be used, for example, to perform one or more operations that integrate the organizational data 311 and associated activities based on the organizational data 311 across one or more different computing systems (e.g., such as computing systems 302, 306, and 310) and/or applications (e.g., such as applications 304, 308, and 312). For example, the integration data 314 can be used to integrate and synchronize organizational data 311 and/or associated operations across an organizational data management application or system (e.g., a system of record for organization data 311) and each of one or more separate third-party applications that utilize organizational data 311 and/or perform operations based on organizational data 311.

In an embodiment, the integration data 314 can include configuration information associated with integrating and synchronizing data among one or more computing systems and/or applications. For example, the integration data 314 can include information that enables integration between an organizational application (e.g., an application 312 associated with an organizational data management system of record for the organizational data 311) and each of one or more separate third-party applications (e.g., application 304, 308) that use or perform operations based on the organizational data 311). Such integration data 314 may include, but is not limited to, information indicating and/or describing various data that enables performance of an integration between applications or systems, such as an integration type information (e.g., flat file, application programming interface (API), webhook, system call, etc.), security information (authentication information, encryption information, etc.) technical information (e.g., file locations, call information, system naming, application naming, IP address information, port information, etc.), integration flow information (e.g., push, pull, bidirectional, etc.), integration activation (e.g., scheduling or timing information, event information, one or more rules, one or more triggering conditions or criteria, etc.), processing information (e.g., data mappings between the source and target, data validation rules, data transformations, error handling, etc.), and/or any other information used in defining, configuring, and/or integrating an application with each of any number of third-party applications and/or systems.

The computing system 310 includes the data structures 315, which can be implemented on the computing system 310 and used to perform operations involving the organizational data 311 including, but not limited to, performing integration and synchronization of the organizational data 311 with one or more different third-party applications and/or systems. In an embodiment, the data structures 315 generally can include information about the properties or attributes of each of one or more entities associated with the organizational data 311. Data structures 315 also can include information describing relationships associated with one or more entities associated with the organizational data 311. In some embodiments, the data structures 315 generally can be used in validating and processing the organizational data 311 and/or other information received from third-party applications and/or systems. The data structures 315 also can be used in association with performing or otherwise carrying out one or more operations involving the organizational data 311 including, but not limited to, processing requests, validating queries, generating workflows, executing workflows, creating reports, running reports, etc.

In an embodiment, the data structures 315 can include one or more object graphs that provide information about entities, relationships, rules, constraints, and/or any other aspects of managing the organizational data 311. For example, such object graphs can include one or more nodes representing entities associated with the organizational data 311 and one or more edges that connect and represent relationships between the nodes. The data structures 315 can also include organizational data and/or associated metadata. In addition, the data structures 315, together or alone, generally may represent one or more aspects of an application or system (e.g., such as an organizational data management system that is a system of record for organizational data 311 of an organization).

In an embodiment, the application store computing system 320 provides an organization with access to multiple different integration applications 330 for integrating organizational data 311 and/or associated processes with and across various different applications and/or systems (e.g., such as third-party applications and/or systems). Application store computing system 320 also may provide an organization with one or more other types of applications, including but not limited to, platform utility apps 360 that provide additional functionality to an organizational data management application or system, other apps 362 that may include integration-related applications, and/or any other types of applications. Generally, the application store computing system 320 may provide one or more various applications for a flat fee, based on a subscription purchase, for a fee based on usage, for a fee based on a number of users, computing systems, processors, or any other criteria, as part of a limited trial, for free, and/or generally under any type of arrangement. In an embodiment the application store computing system 320 is managed and provided by the same party that provides an organizational data management system to organizations. For example, the integration applications 330 provided by the application store computing system 320 generally may be specialized for use with the organizational data management system (e.g., and not end-user versions of applications that would be installed for general purpose use by end-users on end-user devices).

In an embodiment, the integration applications 330 generally can be any application that allows an organization to manage any one or more aspects associated with providing one or more corresponding end-user applications to individual members, teams, roles, departments, and/or any other grouping or categorization of individuals in an organization. For example, each of the integration applications 330 can be used by an organization to control and automate various tasks associated with provisioning, configuring, maintaining, and integrating third-party applications. In some embodiments, one or more of the integration applications 330 can allow an organization to configure automated assignment of a corresponding end-user application to one or more individuals, user account creation, single sign-on setup, provisioning, installation, setup, and/or maintenance of corresponding end-user applications (e.g., third-party applications or other applications provided for use by end users) provided to particular individuals, groups, and/or one or more devices associated with such individuals or groups in the organization.

In an embodiment, one or more of the integration applications 330 can provide integration of organizational data 311 and associated services across third-party applications or computing systems and one or more applications or computing systems of an organization associated with organizational data 311. For example, each of the integration applications 330 can provide one or more of user account creation, single sign-on integration, user account suspension or removal, user management, group management, user privileges, user data access, user data control, template management, data integration, process automation, and/or any other types of integration between applications (e.g., third-party applications or other applications) that are associated with organizational data 311 of an organization.

In an embodiment, the integration applications 330 and/or other applications provided by the application store computing system 320 may include, but are not limited to, collaboration apps 340, support apps 342, design apps 344, development apps 346, finance and legal apps 348, human resources (HR) and benefits apps 350, information technology (IT), device management, and security apps 352, office management apps 354, sales and marketing apps 356, charitable apps 358, platform utility apps 360, and/or other apps 362. Generally, various different types of applications provided by the application computing system 320 may be organized, categorized, grouped, presented, and/or otherwise offered in any type of arrangement, and thus are not limited to any particular examples discussed herein, which are provided for illustration purposes only.

In an embodiment, collaboration apps 340 may include, for example, any applications that provide scheduling, communications, document sharing and management, electronic signature services, project management, productivity, and/or any other types of applications that facilitate work between individuals, groups, and/or parties.

In an embodiment, support apps 342 may include, for example, any applications that provide services associated with customer support, technical support, issue reporting, issue management and escalation, tracking and managing help desk tickets, and/or any other types of applications that facilitate customer, business, and/or technology support.

In an embodiment, design apps 344 may include, for example, any applications that provide services associated with creating graphic designs, product designs, prototypes, drawings, graphical user interfaces, user experiences, and/or any other types of applications that facilitate the creation of designs, interfaces, and/or artistic works.

In an embodiment, development apps 346 may include, for example, any applications that provide services associated with software development, software testing, source code control and management, source code scanning, application testing, process automation, cloud hosting and services, system monitoring, error reporting and alerts, machine learning, and/or any other types of applications that facilitate activities associated with building, maintaining, or deploying software applications.

In an embodiment, finance, operational, and legal apps 348 may include, for example, any applications that provide services associated with accounting systems, budgeting systems, vendor management systems, payment systems, travel systems, expense management systems, supply chain systems, manufacturing systems, compliance and governance systems, vendor management systems, contract management systems, and/or any other types of applications and/or systems used to manage various aspects of an organization.

In an embodiment, human resources (HR) and benefits apps 350 may include, for example, any applications that provide services associated with recruiting and hiring, temporary staffing, background checks, payroll and benefits, training and onboarding, retirement planning and contributions, reward and bonus programs, employee training, learning management systems, performance management, time and attendance, and/or systems any other types of applications or systems associated with employee-related activities.

In an embodiment, information technology (IT), device management, and security apps 352 may include, for example, any applications that provide services associated with device management, technology, information security, password management, and/or any activities associated with managing applications, systems, devices, or associated technology.

In an embodiment, office management apps 354 may include, for example, any applications that provide services associated with facilities management, receptionist services, physical access, visitor access, catering services, office layout, office assignments, and or any other types of applications or systems associated with performing office management.

In an embodiment, sales and marketing apps 356 may include, for example, any applications that provide services associated with social media, analytics, advertising, event management, customer relationship management, content creation and distribution, public relations, business generation, campaign management, and/or any other types of similar or related activities.

In an embodiment, charitable apps 358 may include, for example, any applications that provide services associated with donations, charitable giving, crowdfunding, etc.

In an embodiment, platform utility apps 360 may include, for example, any applications from a provider that allow an organization to utilize software applications, systems, or services that have been purchased or that are otherwise available from the provider. For example, a provider of an organizational data management system can allow an organization to access and utilize standard services and/or enhanced services one or more of the platform utility apps 360. In some embodiments, the platform utility apps 360 operate from and/or are directly integrated with applications, systems, and/or services obtained from a provider. For example, such platform utility apps 360 can allow one or more users of an organization to customize a particular implementation or instance of provider software that is associated with the organization. In one example, one of the platform utility apps 360 can allow the creation and/or modification of one or more custom fields in association with one or more entities, the creation and/or modification of one or more relationships among the entities, the creation and/or modification of one or more default system rules or custom rules, the addition and/or use of custom fields, custom relationships and/or custom rules in various workflow tasks, reports, integrations, etc.

In an embodiment, other apps 362 may include, for example, any types of applications that may be used by individuals and/or organizations. The other apps 362 may include, for example, any other category of integration applications 330 and/or any other types of applications that can be executed by a computing system or device.

In an embodiment, authorized users of an organization with the appropriate privileges may access one or more services of the application store computing system 320 directly, for example, via a website, web page, desktop application, mobile application, and/or any other type of application to browse, view, search, compare, evaluate, download, install, configure, upgrade, uninstall, and/or perform any other types of activities associated with the integration applications 330 or any other types of applications provided via the application store computing system 320. In some embodiments, authorized users of an organization with the appropriate privileges may access one or more services of the application store computing system 320 indirectly, for example, through another application (e.g., application 312) and/or another computing system (e.g., computing system 310). In some embodiments, the application store computing system 320 can be provided on the same computing system with other applications and services (e.g., running on computing system 310).

In an embodiment, any one or more users of an organization, such as an administrator, manager, or one or more other users associated with a particular role and/or one or more particular privileges each may install and/or configure each of one or more different integration applications 330 for use by the organization. For example, any such user with the appropriate privileges may install one or more of the integration applications 330 for the organization on the computing system 310 or any other computing systems or devices. Also, any such user with the appropriate privileges may configure integration data 314 associated with each of one or more integration applications 330. In some embodiments, one user with the appropriate privileges may delegate authority to one or more other users to perform installation and/or configuration of one or more of the integration applications for an organization.

In an embodiment, an organizational data management system is provided via at least one computing system to allow each of one or more different organizations to centrally manage their own organizational data 311. For example, the organizational data management system can be provided as a centralized system of record for storing and managing various types of organizational data 311 of an organization. The organizational data management system also can provide various types of integration across different third-party applications that utilize, that perform processing involving or based on, and/or that are otherwise associated with organizational data 311. The organizational data management system also can automate various processing based on the organizational data 311 including, but not limited to the automation of processing performed across various third-party applications based on the organizational data. In various embodiments, the organizational data management system can be provided via one or more different computing systems, one or more different applications, and/or via one or more different services, for example, to one or more different organizations over a computer network.

In an embodiment, a separate instance of an organizational data management system generally can be provided to each of one or more different organizations, for example to allow each organization to independently configure, manage, and integrate their own instance of an organizational data management system, and to secure and insulate organizational data 311 from outside parties. For example, separate instances of an organizational data management system generally may be provided to different organizations using different computer hardware devices, different software applications, different instances of software applications running in an isolated space, different databases, physically partitioned databases, and/or in various other ways.

In an embodiment, an organizational data management system generally enables organizations to efficiently manage organizational data 311 and associated processing that occurs based on the organizational data 311. For example, an organizational data management system may be used as a centralized system of record that is integrated with other computing systems and applications (e.g., third-party applications) that generate, utilize, process, or perform activities based on organizational data 311. Such integration generally allows an organizational data management system to orchestrate and automate processing of organizational data 311 and associated activities across numerous different applications that are not in communication with one another. In some embodiments, an organizational data management system can allow appropriate users (e.g., authenticated, authorized, privileged, etc.) of an organization to, for example, manage organization information, settings of an organizational data management system, onboarding of employees, offboarding of employees, employee information, organizational structure and locations, employee placement in departments and teams, workflows and tasks, reports, documents, and/or any other information associated with organizational data 311.

Figure 4:
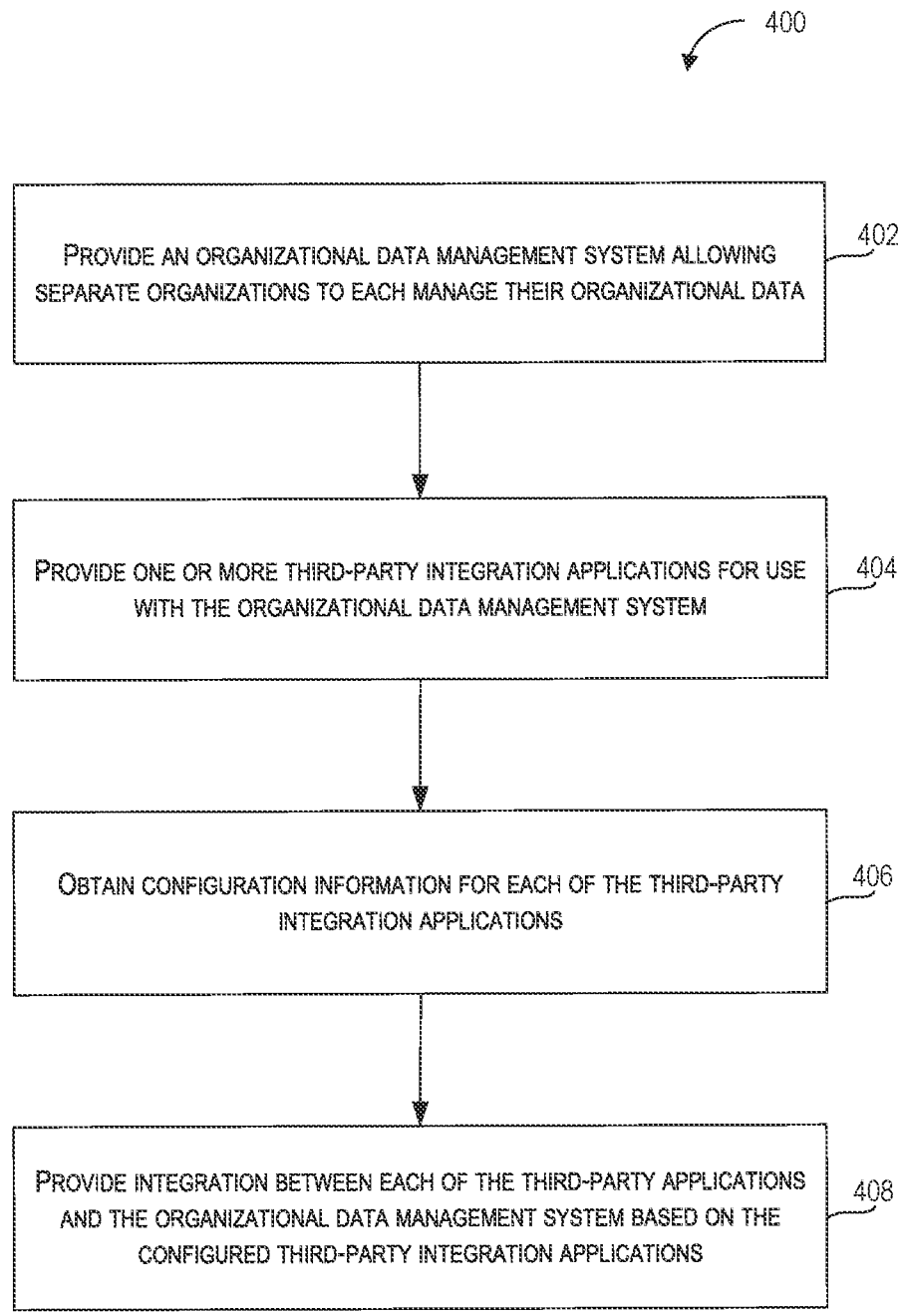
FIG. 4 depicts a flow diagram of an example method for providing third-party application integration in an organizational data management system, according to example embodiments of the present disclosure.

FIG. 4 depicts a flow diagram of an example method 400 for providing third-party application integration in an organizational data management system, according to example embodiments of the present disclosure. One or more portions of the method 400 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 400 can be executed or implemented as an algorithm on the hardware devices or systems disclosed herein. FIG. 4 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

At 402, a computer system provides an organizational data management system allowing separate organizations to each manage their own organizational data. In an embodiment, an organization uses an organizational data management system that allows the organization to manage organizational data 311 and activities performed based on the organizational data 311. In some embodiments, an organization can install and use an organizational data management system on a computing system (e.g., computing system 310 or any other computing system) that is dedicated to the organization. Also, an organizational data management system can comprise any one or more of organizational data 311, application(s) 312, application policy data 313, integration data 314, data structures 315, and/or any other information associated with managing, processing, and performing activities associated with organizational data 311.

In an embodiment, an organizational data management system may be provided by another party for use by an organization. For example, another party such as a software application provider may host or otherwise provide a separate instance of an organizational data management system to each of one or more different organizations allowing each organization to independently manage their own organizational data 311. In such embodiments, each separate instance of an organizational data management system provided to an organization can respectively comprise any one or more organizational data 311, application(s) 312, application policy data 313, integration data 314, data structures 315, and/or any other information associated with managing, processing, and performing activities associated with organizational data 311 for the particular organization. As such, an organizational data management system may be a cloud-based platform that maintains organizational data 311 and other information associated with each of one or more different organizations and that allows each of the different organizations to independently manage their own respective organizational data 311 and related processes independently from any other organization.

At 404, a computer system installs one or more third-party integration applications for use with an organizational data management system. In an embodiment, an authenticated and authorized user of an organization (e.g., an organizational administrator, manager, permitted delegate, etc.) can use and configure an organizational data management system for use by the organization. Such a user of the organization also may access an application store computing system 320 directly (e.g., via a web address or application 304, 308, 312) or through an interface provided by an organizational data management system to view and obtain applications that are available for use with an organizational data management system. For example, the application store computing system 320 can provide any number of different specialized integration applications 330 for use with an organizational data management system where each of the integration applications 330 provides specialized integration between the organizational data management system and a particular application (e.g., a third-party application) for managing organizational data 311 and/or processing associated with organizational data 311.

In an embodiment, an authenticated and authorized user of the organization may select and obtain one or more of integration applications 330 and/or other applications available from the application store computing system 320 for use with an organizational data management system. For example, the user may purchase or otherwise obtain access to one or more of the applications for download, installation, activation, and/or configuration in association with the organizational data management system of the organization. In some embodiments, once access is obtained, the integration applications 330 can be installed and/or activated automatically by a provider of the organizational data management system without any additional user involvement allowing an organization to configure the integration applications 330 from within the organizational data management system itself (e.g., via a graphical user interface of an application provided by the organizational data management system). In one example embodiment, one or more of the integration applications 330 is a service or feature that is a part of an organizational data management system that is activated or otherwise turned on to provide an organization with access to an integration application.

In an embodiment, integration applications 330 obtained by an organization can be provided on a computing system (e.g., computing system 310) that is associated with an organizational data management system and one or more associated applications (e.g., application(s) 312). For example, each of one or more of these applications generally may provide one or more types of integration between an organizational data management system and a corresponding third-party application associated with organizational data 311. For example, any one or more integration applications 330 provided for use with an organizational data management system may provide one or more types of integration with a corresponding third-party application including, but not limited to, flat file integration, electronic data interchange (EDI) integration, application programming interface (API) integration, webhook integration, and/or any other types of integration between software applications, computing systems, and/or devices.

In various embodiments, flat file integration generally may include any file-based integration where data is provided in a formatted file (e.g., CSV, XML, JSON, etc.). EDI integration generally may include file or message-based integration specified according to a fixed or variable length format. API integration generally may include any interfaces that define and allow interaction between software applications (e.g., custom APIs, industry standard APIs, proprietary APIs, open APIs, web APIs, REST APIs, etc.). Datahook and/or webhook integration generally may include any automated call, callback, messaging, or response to an event. Integrations generally may include any type of data sharing implementation between two or more software applications, systems, and/or devices and are not limited to the listed examples, which are provided for illustration purposes only.

At 406, a computer system obtains configuration information for each of one or more of third-party application integrations installed on an organizational data management system. In an embodiment, an organization can configure each of one or more application(s) 312 that provide integration with a corresponding third-party application. For example, such applications and/or an organization data management system may provide a graphical user interface that allows an organization to select and/or specify integration data 314 used to configure and implement respective integrations. In an embodiment, integration data 314 may include various types of information used to configure, manage, operate, and perform any other activities associated with an integration. For example, integration data 314 may include, but is not limited to, organizational user permissions associated with an integration, integration setup information (e.g., security keys, credentials, etc.), integration rules, single sign-on setup for the organization, and/or default provisioning of associated third-party application to organization users.

Integration data 314 also may include information (e.g., configuration or other information) that enables operation of an integration between an organizational data management system and a third-party application. For example, such information may include, but is not limited to, information defining an integration type (e.g., flat file, application programming interface (API), webhook, system call, etc.), integration security information (authentication information, encryption information, etc.) integration technical information (e.g., file locations, call information, system naming, application naming, IP address information, port information, etc.), integration flow information (e.g., push, pull, bidirectional, etc.), integration activation information (e.g., scheduling or timing information, event information, one or more integration rules, information defining one or more triggering conditions or criteria, etc.), integration processing information (e.g., file formatting, data mappings between the source and target, data validation rules, data transformations, error handling, etc.), and/or any other associated with integrating an organizational data management system and third-party applications.

At 408, a computer system provides integration between each of one or more different third-party applications and an organizational data management system based on configured third-party integration applications. In an embodiment, an organizational data management system receives and processes information from each of one or more third-party applications. For example, an organizational data management system may use an integration application provided to an organization (e.g., application 312) and associated integration data 314 to obtain and process various information from a third-party application and/or to provide various information to the third-party application.

In an embodiment, an organizational data management system may receive and process organizational data 311 obtained from one or more different third-party applications. For example, such organizational data 311 may include new, modified, augmented, removed, and/or any other type of change to organizational data 311. Such changes then may be used to update organizational data 311 in the organizational data management system, which then may update one or more other third-party applications accordingly. The organizational data management system also may perform one or more operations associated with information received from third-party applications. For example, the organizational data management system may receive information associated with organizational data 311 and update tasks, workflow processes, reports, and/or other types of organizational data 311. The organizational data management system also may generate new tasks, workflow processes, and/or reports. Additionally, the organizational data management platform can provide organizational data 311, requests, instructions, messages, and/or other types of information and communications to one or more third-party applications based on established integrations.

Figure 5:
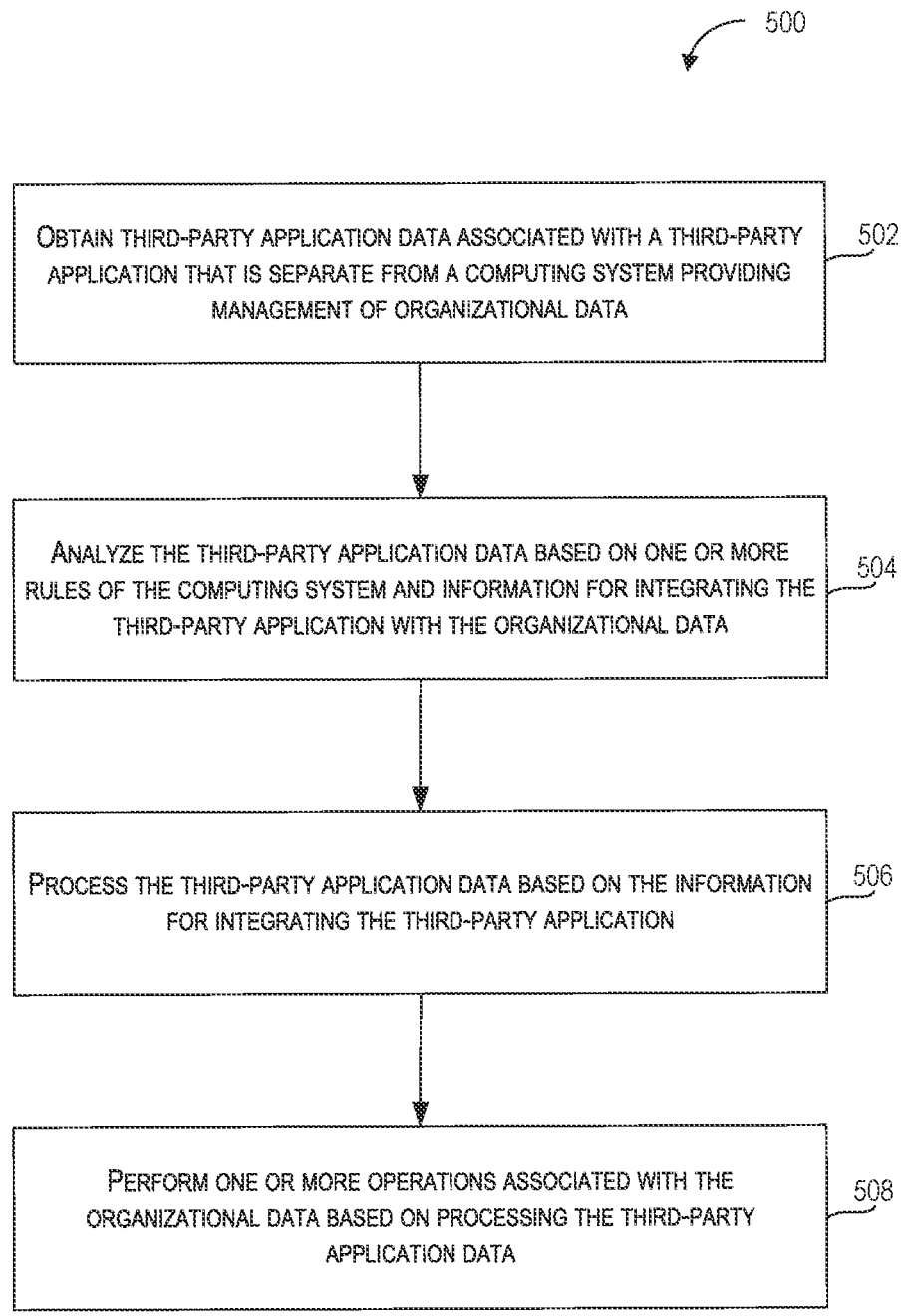
FIG. 5 depicts a flow diagram of an example method for providing third-party application integration with an organizational data management system, according to example embodiments of the present disclosure.

FIG. 5 depicts a flow diagram of an example method 500 for providing third-party application integration with an organizational data management system, according to example embodiments of the present disclosure. One or more portions of the method 500 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 500 can be executed or implemented as an algorithm on the hardware devices or systems disclosed herein. FIG. 5 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

At 502, a computer system obtains third-party application data that is associated with a separate third-party application different from the computing system. In an embodiment, an organizational data management system receives organizational data 311 and/or other information from a third-party application based on an integration that has been established between the organizational data management system and the third-party application. For example, the third-party application can be an application provided by another party that uses organizational data 311 and/or performs activities based on organizational data 311 but is separate from the organizational data management system.

In an embodiment, the organizational data management system accesses an integration application (e.g., application 312) associated with integration data 314 to obtain the third-party application data. For example, the organizational data management system may use the integration application and/or the integration data 314 to request, obtain, pull, and/or perform any other actions to obtain third-party application data. In some embodiments, a third-party application provides third-party application data directly to the organizational data management system (e.g., via a flat file, API call, and/or other integration). In some embodiments, an integration application and/or integration data 314 can include information that maps or otherwise associates third-party application data with an integration environment (e.g., staging tables, processing queues, etc.) and/or organizational data 311 maintained by organizational data management system for an organization. In some examples, integration data 314 includes information for mapping one or more fields of third-party application data to one or more custom, user defined fields in organizational data 311 (e.g., custom fields for users, custom fields for devices, custom fields for timecards, custom fields in reports, etc.). In some examples, one or more objects may include one or more custom fields mapped to respective third-party application data from each of one or more third-party applications. Also, one or more custom fields may be mapped, generated, or otherwise based on a combination of respective third-party application data from multiple different third-party applications. In some examples, custom fields are added, created, and/or defined by an organization or user of an organization using a utility application (e.g., application 312) associated with an organizational data management system. In some examples, custom fields may be detected in third-party application data by the organizational data management system and added to associated entities in the system, for example automatically or based on approval from one or more users of the organization.

At 504, a computer system analyzes third-party application data based on one or more rules associated with the computing system and information for integrating a third-party application associated with the third-party application data. In an embodiment, an organizational data management system analyzes third-party application data from a third-party application based on one or more rules associated with the organizational data management system. For example, the organizational data management system may analyze the third-party application data based on or more rules of the system to ensure that the information is compatible with and can be processed by the system. In some embodiments, such rules may be stored and accessed by the organizational data management system in one or more data structures (e.g., an object graph and/or one or more portions of an object graph) and associated metadata maintained by the organizational data management system which defines entities, relationships between entities, and/or other rules defined by the system.

In an embodiment, an organizational data management system analyzes third-party application data based on one or more rules associated with integrating the organizational data management system with the third-party application. For example, the organizational data management system may analyze incoming third-party application data based on one or more rules associated with an integration application (e.g., application 312) and/or integration data 314 used to integrate the third-party application with the organizational data management system. In some embodiments, the organizational data management system analyzes the third-party application data to ensure that the information meets one or more data validation rules configured by an organization and/or to determine processing for the third-party application data based on rules configured by the organization.

At 506, a computer system processes third-party application data based on information for integrating an associated third-party application. In an embodiment, the organizational data management system processes the third-party application data based on information associated with an integration application (e.g., an integration application 312 installed in association with an organizational data management system) and/or associated integration data 314 that corresponds to a third-party application associated with the information. In some embodiments, the organizational data management system performs one or more operations to the third-party application data (e.g., modification, transformation, augmentation, etc.) in preparation for using the third-party application data in processing associated with organizational data 311 of an organization. In some embodiments, the organizational data management system processes the third-party application data to allow the third-party data to be used with one or more custom, user-defined fields associated with organizational data 311. For example, an organization and/or one or more users of an organization can define custom fields for use with various organizational data 311 including, but not limited to entities, relationships, records, reports, and/or operations provided by an organizational data management system.

At 508, a computer system performs one or more operations associated with organizational data based on third-party application data. In an embodiment, the organizational data management system can update organizational data 311 and associated records based on third-party application data. For example, organizational data 311 associated with one or more entities can be created, modified, removed, and/or processed in various ways based on third-party application data. In some embodiments, organizational data 311 can be updated in the organizational data management system as a centralized system of record that receives and processes various information received from multiple different third-party applications of other parties. For example, the organizational data management system can maintain a consistent and accurate version of organizational data 311, synchronize various organizational data 311 across third-party applications, orchestrate processing based on organizational 311 data across various third-party applications, etc.

In an embodiment, an organizational data management system can perform one or more operations associated with an application policy or any other type of policies and/or rules associated with the organizational data management system. For example, the organizational data management system can perform one or more operations that are triggered based on the third-party application data. Other operations may include, but are not limited to creating workflows, generating or updating workflow information, creating tasks, generating or updating task information, generating reports, refreshing reports, modifying reports, updating custom fields used in records or reports, generating alerts or other types of messages, transmitting alerts or other types of messages, etc. In various embodiments, the organizational data management system can generate and transmit one or more updates to one or more third-party applications in view of performing operations involving organizational data 311 based on third-party application data from a third-party application.

Figure 6:
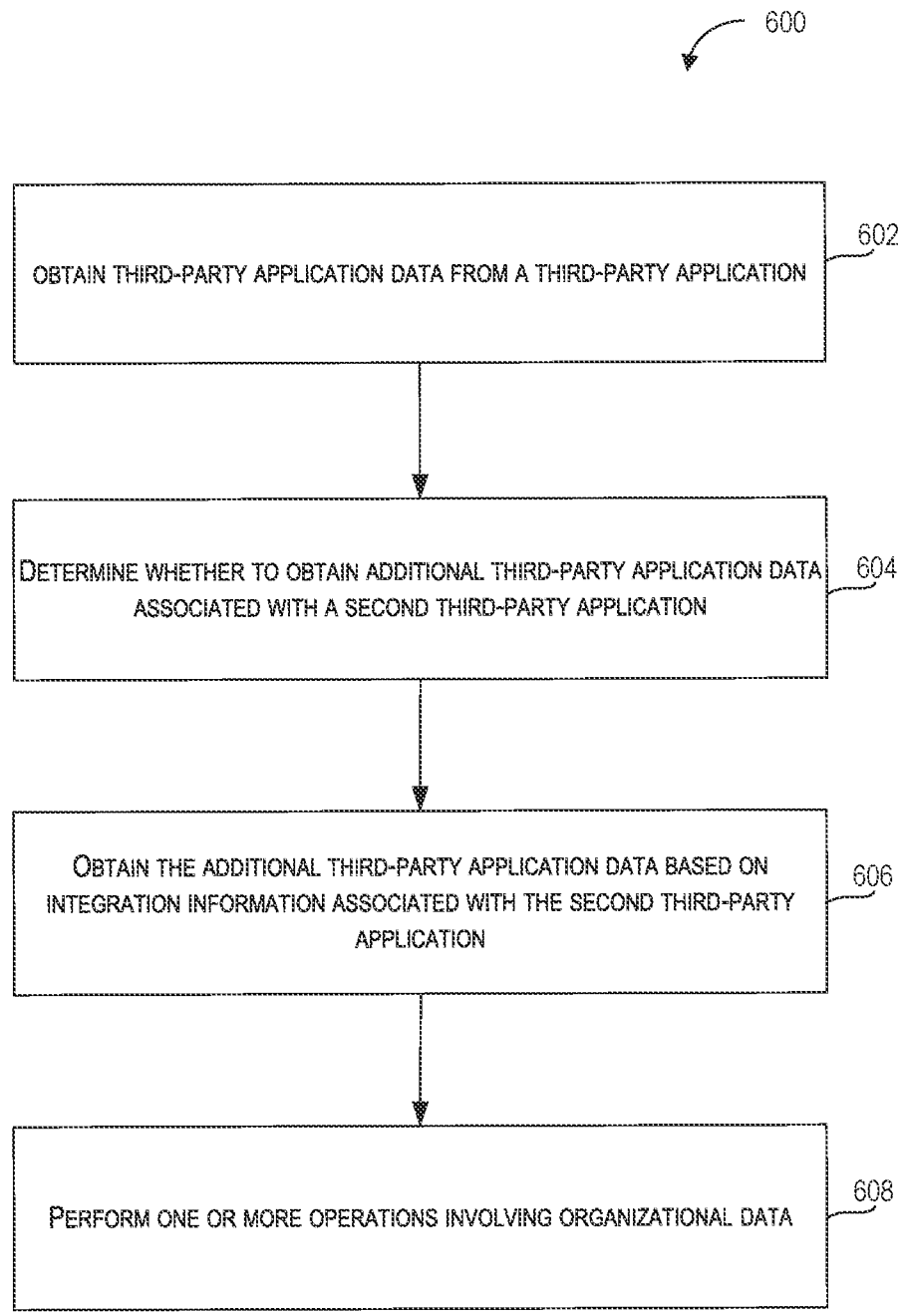
FIG. 6 depicts a flow diagram for providing third-party application integration involving multiple third-party applications and an organizational data management system, according to example embodiments of the present disclosure.

FIG. 6 depicts a flow diagram for providing third-party application integration involving multiple third-party applications and an organizational data management system, according to example embodiments of the present disclosure. One or more portions of the method 600 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 600 can be executed or implemented as an algorithm on the hardware devices or systems disclosed herein. FIG. 6 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

At 602, a computer system obtains third-party application data associated with a third-party application. In an embodiment, an organizational data management system receives information from a third-party application comprising organizational data 311 (and/or other information) via an integration established between the organizational data management system and the third-party application for an organization. For example, the third-party application can be an application provided by another party that uses organizational data 311 and/or performs activities based on organizational data 311 but is a party that is different from the organization and/or different from the party providing the organizational data management system. In some embodiments, the third-party application data comprises information associated with one or more custom, user-defined fields associated with organizational data 311.

At 604, a computer system determines whether to obtain additional third-party application data associated with a second third-party application. In an embodiment, an organizational data management system analyzes and processes third-party application data received from a first third-party application. As part of the analyzing and/or the processing of the third-party application data, the organizational data management system can determine whether to obtain additional third-party application data associated with one or more other third-party applications. For example, the third-party data associated with the first third-party application may depend upon or otherwise be associated with one or more other separate third-party applications used by the organizational data management system.

In an embodiment, third-party application data from multiple different third-party applications may be used in the same processes, related processes, dependent processes, the same entities, related entities, dependent entities, and/or in other types of arrangements. In some embodiments, one or more custom fields in organizational data 311 (e.g., custom fields in reports) can be based upon third-party application data from one or more different third-party applications. As such, when performing various operations, an organizational data management system may check for a dependency associated with third-party application data from one or more third-party applications.

At 606, a computer system obtains additional third-party data associated with another third-party application. In an embodiment, an organizational data management system determines that additional third-party application data associated with a different third-party application is to be obtained for processing. For example, the organizational data management system may identify a dependency, inconsistency, and/or requirement associated with organizational data 311 that is to be satisfied based on third-party application data available from another third-party application.

In an embodiment, the organizational data management system can access a second integration application (e.g., application 312) and/or second integration data 314 associated with a second third-party application to obtain third-party application data associated with the second third-party application. For example, the organizational data management system may use such an integration established between the organizational data management system and the second third-party application to obtain information for processing organizational data 311.

At 608, a computer system performs one or more operations involving organizational data. In an embodiment, an organizational data management system uses third-party application data received from each of multiple separate third-party applications to process organizational data 311. For example, the organizational data management system may use a separate integration with each third-party application to obtain corresponding third-party application data from each third-party application. The organizational data management system can use such respective third-party application data to update organizational data 311 and/or perform one or more processes associated with organizational data 311.

In an embodiment, an organizational data management system updates organizational data 311 (e.g., entities, records, reports, and/or other objects that utilize organizational data 311) based on a combination of information from multiple different third-party applications. In some examples, the organizational data management system updates or refreshes one or more custom, user-defined objects and/or user-defined fields based on third-party application data associated with one or more third-party applications. In one example, a timecard object may include one or more custom fields added by an organization based on an employee's productivity in a work tracking application or system. For example, the timecard may include a custom field that calculates an employee's productivity per hour (e.g., resolutions per hour, items completed per hour, etc.). The timecard also may include other custom fields, such as an employee's rank compared to others, for example, based resolutions or items completed in general, per hour, etc. In addition, custom fields may include calculations based on a combination of data associated with different third-party applications. Further, objects, records, and other data structures may include one or more custom fields that each depend upon different third-party application data.

Figure 7:
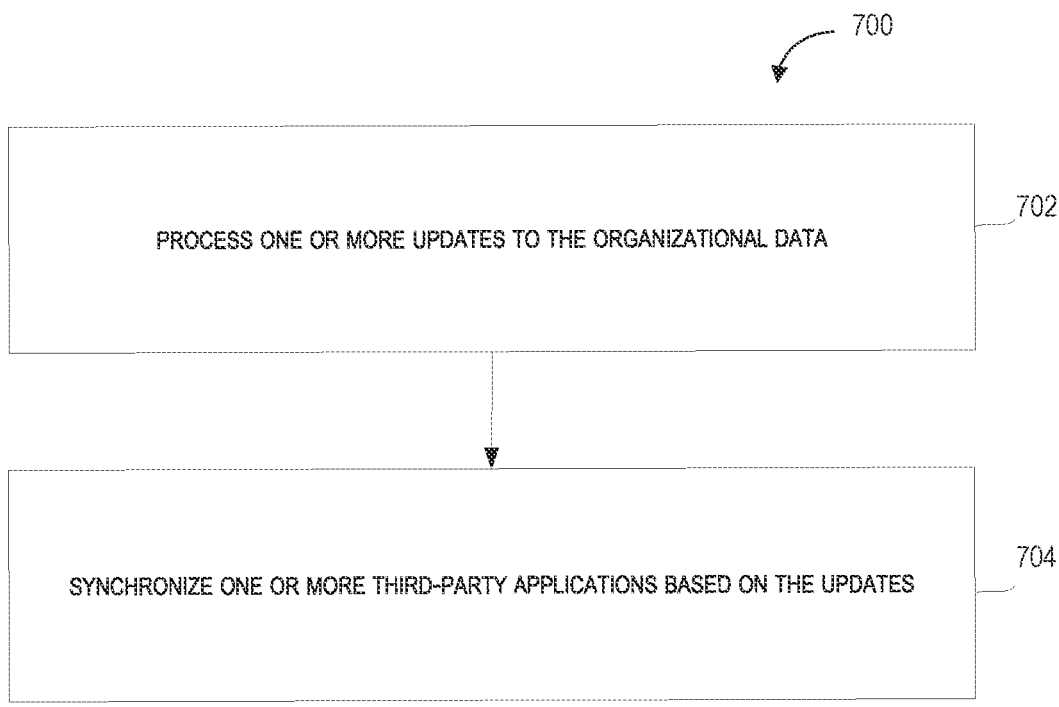
FIG. 7 depicts a flow diagram for providing third-party application integration involving synchronization between an organizational data management system and one or more third-party applications, according to example embodiments of the present disclosure.

FIG. 7 depicts a flow diagram for providing third-party application integration involving synchronization between an organizational data management system and one or more third-party applications, according to example embodiments of the present disclosure. One or more portions of the method 700 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 700 can be executed or implemented as an algorithm on the hardware devices or systems disclosed herein. FIG. 7 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

At 702, a computer system processes one or more updates associated with organizational data. In an embodiment, an organizational data management system receives one or more updates to organizational data 311. For example, organizational data 311 may be updated centrally by a user of the organization via an application or associated user interface provided by the organizational data management system. In addition, organizational data 311 also may be updated based on information received via integrations associated with each of one or more different third-party applications that are separate and unassociated with a provider of the organizational data management system.

At 704, a computer system synchronizes one or more third-party applications based on one or more updates associated with organizational data. In an embodiment, an organizational data management system synchronizes organizational data 311 and/or processing of organizational data 311 across one or more different third-party applications. For example, the organizational data management system can utilize respective integrations established with each of one or more different third-party applications to keep organizational data 311 and/or associated processing consistent and synchronized across such third-party applications.

In an embodiment, the organizational data management system can receive information from one or more third-party applications, process the information from the third-party applications separately and/or in combination, perform one or more updates to organizational data 311 based on the processing, and/or communicate with each of one or more different third-party applications to provide information to keep organizational data 311 and associated processing consistent with the organizational data management system and across the third-party applications.

Figure 8:
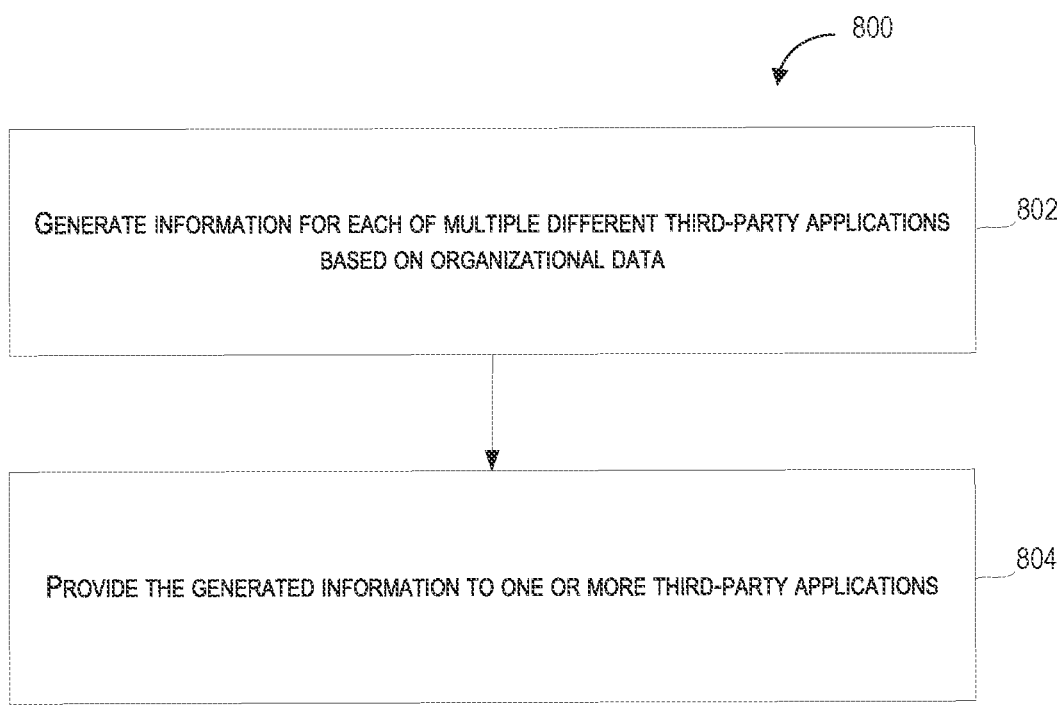
FIG. 8 depicts a flow diagram for providing third-party application integration with one or more third-party applications based on information generated by an organizational data management system.

FIG. 8 depicts a flow diagram for providing third-party application integration with one or more third-party applications based on information generated by an organizational data management system. One or more portions of the method 800 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 800 can be executed or implemented as an algorithm on the hardware devices or systems disclosed herein. FIG. 8 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

At 802, a computer system generates information for different third-party applications based on organizational data. In an embodiment, an organizational data management system generates information for each of a plurality of different third-party applications based on one or more events and/or changes to organizational data 311. For example, an onboarding event associated with organizational data 311 of a new employee (and/or any other type of organizational data 311 update or associated event) may trigger one or more updates in an organizational data management system and/or across different third-party applications based on one or more rules, policies, and/or processes. For example, an organizational data management system may automatically communicate with multiple different third-party applications independently via separate, respective integrations to carry out various activities for completing any type of event or update. In one example, the organizational data management system may communicate with different third-party applications to automatically perform a variety of tasks without manual intervention based on organizational data 311 that may include, but are not limited to, provisioning one or more computing devices to the user (e.g., based on position, team, role, etc.), creating an account for the user for each of one or more applications, installing and configuration applications and other software on computing devices for the user, provide a user with access to one or more rooms, channels, or other spaces in collaboration applications (e.g., create a corresponding account for the employee in the collaboration application, automatically add the account to rooms/channels/spaces based on associated team membership, position, role, level, etc.), assigning the user employee to required organizational training and other training based on the position or role of the user, to generate and transmit messages, to provide new or updated organizational data, and/or to perform any other activities across multiple different third-party applications utilized by the organization for various different purposes.

In some examples, an onboarding or other type of event triggers one or more rules, processes, and/or policies that are applied in real-time or near real time based on organizational data 311 associated with the employee, for example, to associate an employee with one or more particular roles, one or more particular groups, one or more particular applications, one or more particular application groupings, one or more application licenses, one or more organization spending policies, etc. Such rules, processes, and/or policies also may be used to automatically create permissions for one or more the employee's accounts and/or automatically configure permissions allowing other appropriate individuals to view and manage the employee's account (e.g., one or more managers, one or more organization administrators, etc.)

At 804, a computer system provides information generated based on organizational data to one or more third-party applications. In an embodiment, an organizational data management system transmits or otherwise communicates information generated for each particular third-party application to the corresponding third-party application. For example, an organizational data management system can provide information to each third-party application via a corresponding integration between the organizational data management system and each respective third-party application. In one example, the organizational data management system automatically communicates with a third-party application associated with a supplier in view of an onboarding event and associated organizational data 311 to submit an order requesting computer hardware with applications configured and installed for an employee based on position, team, role, etc. In another example, the organizational data management system further communicates with one or more other third-party applications to automatically perform other activities associated with the onboarding event based on organizational data. For example, the organizational data management system can communicate with each of one or more different third-party applications to create an account for a new employee in each of the third-party applications, to configure the new employee's account in each of the third-party applications, to assign appropriate permissions to the new employee in each of the third-party applications, to associate the new employee account in each of the third-party applications with the appropriate roles, teams, groups, spaces, channels, and/or to perform any one or more activities across any number of third-party applications based on organizational data 311 to support operations of an organization.

Numerous details are set forth in the foregoing description. However, it will be apparent to one of ordinary skill in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "analyzing," "accessing," "determining," "identifying," "adjusting," "modifying," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for performing third-party application integration, comprising:
obtaining, by one or more processors, third-party application data associated with a third-party application that is separate from a computing system that comprises organizational data of an organization, wherein the computer system maintains the organizational data as data of record for the organization in view of respective third-party application data received from each of a plurality of third-party applications, and wherein the organization data acts as a centralized system of record for organizational management processes of the organization;
determining, by the one or more processors, whether to obtain other third-party application data associated with a different third-party application that is separate from the computing system and separate from the third-party application;
generating, by the one or more processors, information associated with the organizational data for each of a plurality of other third-party applications separate from the computing system and separate from the third-party application;
providing, by the one or more processors, the generated information to each of the other third-party applications;
analyzing, by the one or more processors, the third-party application data based on one or more rules associated with the computing system and integration information for integrating the third-party application with the organizational data of the organization, wherein the one or more rules associated with the computing system are determined based on analyzing one or more data structures associated with the organizational data, wherein at least one of the data structures is an object graph data structure comprising a plurality of entities associated with the organizational data, and wherein the organizational data includes organizational structure data and the organization structure data indicate a first group of employees have a certain set of permissions relative to a particular group of devices;
processing, by the one or more processors, the third-party application data based on the integration information associated with the third-party application and the organizational structure data;
performing, by the one or more processors, one or more operations associated with the organizational data based on processing the third-party application data; and providing, by the one or more processors, information associated with the organizational data to one or more third-party applications that are separate from the computing system based on processing the third-party application data.

2. The computer-implemented method of claim 1, further comprising:
accessing, by the one or more processors, the integration information associated with the third-party application from the computing system.

3. The computer-implemented method of claim 1, wherein the integration information associated with the third-party application comprises one or more mappings for integration between the third-party application data and the organizational data of the organization.

4. The computer-implemented method of claim 1, wherein the integration information is associated with an instance of an integration application installed in association with an instance of an organizational data management application for the organization on the computing system, the integration application providing integration between the organizational data management application and the third-party application.

5. The computer-implemented method of claim 4, wherein the instance of the integration application is among one or more other integration applications installed in association with the instance of the organizational data management application for the organization, wherein each respective one of the other integration applications provides integration between the organizational data management application and a different corresponding third-party application.

6. The computer-implemented method of claim 1, further comprising:
accessing, by the one or more processors, the one or more rules associated with the computing system.

7. The computer-implemented method of claim 1, further comprising:
obtaining, by the one or more processors, other third-party application data associated with a different third-party application that is separate from the computing system and separate from the third-party application.

8. The computer-implemented method of claim 1, wherein processing the third-party application data comprises performing processing associated with one or more of a policy, a workflow, or a report of the organization based at least in part on the third-party application data.

9. The computer-implemented method of claim 1, wherein the computer system is a cloud-based organizational data management platform that maintains respective organizational data for each of a plurality of different organizations, the cloud-based organizational data management platform allowing each of the different organizations to manage their own respective organizational data independent from any other organization.

10. The computer-implemented method of claim 1, wherein performing one or more of the operations comprises updating one or more fields in the organizational data that are associated with the third-party application.

11. The computer-implemented method of claim 10, wherein one or more of the fields are user-defined fields associated with the third-party application data of the third-party application.

12. One or more tangible non-transitory computer-readable media storing computer-readable instructions that, when executed by one or more processors, cause the one or more processors to:

obtain third-party application data associated with a third-party application that is separate from a computing system that comprises organizational data of an organization, wherein the computer system maintains the organizational data as data of record for the organization in view of respective third-party application data received from each of a plurality of third-party applications, and wherein the organization data acts as a centralized system of record for organizational management processes of the organization;

determine whether to obtain other third-party application data associated with a different third-party application that is separate from the computing system and separate from the third-party application;

generate information associated with the organizational data for each of a plurality of other third-party applications separate from the computing system and separate from the third-party application;

provide the generated information to each of the other third-party applications;

analyze the third-party application data based on one or more rules associated with the computing system and integration information for integrating the third-party application with the organizational data of the organization, wherein the one or more rules associated with the computing system are determined based on analyzing one or more data structures associated with the organizational data, wherein at least one of the data structures is an object graph data structure comprising a plurality of entities associated with the organizational data, and wherein the organizational data includes organizational structure data and the organization structure data indicate a first group of employees have a certain set of permissions relative to a particular group of devices;

process the third-party application data based on the integration information associated with the third-party application and the organizational structure data;

perform one or more operations associated with the organizational data based on processing the third-party application data; and provide information associated with the organizational data to one or more third-party applications that are separate from the computing system based on processing the third-party application data.

13. A computing system, comprising:
one or more processors; and
one or more non-transitory computer-readable media storing instructions that, when executed by the one or more processors, cause the one or more processors to:
obtain third-party application data associated with a third-party application that is separate from a computing system that comprises organizational data of an organization, wherein the computer system maintains the organizational data as data of record for the organization in view of respective third-party application data received from each of a plurality of third-party applications, and wherein the organization data acts as a centralized system of record for organizational management processes of the organization;

determine whether to obtain other third-party application data associated with a different third-party application that is separate from the computing system and separate from the third-party application;

generate information associated with the organizational data for each of a plurality of other third-party applications separate from the computing system and separate from the third-party application;

provide the generated information to each of the other third-party applications;

analyze the third-party application data based on one or more rules associated with the computing system and integration information for integrating the third-party application with the organizational data of the organization, wherein the one or more rules associated with the computing system are determined based on analyzing one or more data structures associated with the organizational data, wherein at least one of the data structures is an object graph data structure comprising a plurality of entities associated with the organizational data, and wherein the organizational data includes organizational structure data and the organization structure data indicate a first group of employees have a certain set of permissions relative to a particular group of devices;

process the third-party application data based on the integration information associated with the third-party application and the organizational structure data;

perform one or more operations associated with the organizational data based on processing the third-party application data; and provide information associated with the organizational data to one or more third-party applications that are separate from the computing system based on processing the third-party application data.

14. The computing system of claim 13, wherein the integration information comprise a user-defined query expression that is expressed in a domain-specific query language, and wherein processing the third-party application data based on the integration information comprises evaluating the user-defined query expression against the organizational data of the organization.

* * * * *